United States Patent
Brown et al.

(10) Patent No.: US 10,774,662 B2
(45) Date of Patent: Sep. 15, 2020

(54) SEPARABLE TURBINE VANE STAGE

(71) Applicant: Rolls-Royce Corporation, Indianapolis, IN (US)

(72) Inventors: Elise A. M. Brown, Indianapolis, IN (US); Emma L. Mitchell, Indianapolis, IN (US); Elyse M. McMillen, Indianapolis, IN (US); David L. Tondreau, III, Indianapolis, IN (US); Eric T. Koenig, Fishers, IN (US); Linnea L. Taketa, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 104 days.

(21) Appl. No.: 16/037,580

(22) Filed: Jul. 17, 2018

(65) Prior Publication Data
US 2020/0024996 A1 Jan. 23, 2020

(51) Int. Cl.
*F01D 17/16* (2006.01)
*F01D 9/04* (2006.01)

(52) U.S. Cl.
CPC ........ *F01D 9/042* (2013.01); *F05D 2220/321* (2013.01); *F05D 2220/323* (2013.01); *F05D 2230/60* (2013.01); *F05D 2240/12* (2013.01); *F05D 2300/174* (2013.01); *F05D 2300/175* (2013.01)

(58) Field of Classification Search
None
See application file for complete search history.

(56) References Cited

U.S. PATENT DOCUMENTS

| | | | |
|---|---|---|---|
| 3,574,479 A | 4/1971 | Barnard | |
| 4,990,056 A | 2/1991 | McClain et al. | |
| 5,620,301 A | 4/1997 | Lawer | |
| 5,630,701 A | 5/1997 | Lawer | |
| 5,634,766 A * | 6/1997 | Cunha | F01D 5/187 415/115 |
| 5,797,725 A * | 8/1998 | Rhodes | B23P 6/005 415/209.2 |
| 6,099,245 A * | 8/2000 | Bunker | F01D 5/146 415/115 |
| 6,619,916 B1 | 9/2003 | Capozzi et al. | |
| 6,984,105 B2 | 1/2006 | Clark et al. | |
| 7,001,141 B2 | 2/2006 | Cervenka | |
| 7,618,240 B2 | 11/2009 | Saltman et al. | |
| 7,637,716 B2 | 12/2009 | Benton | |
| 7,766,609 B1 | 8/2010 | Liang | |
| 8,105,019 B2 | 1/2012 | McCaffrey et al. | |

(Continued)

FOREIGN PATENT DOCUMENTS

| EP | 2 530 244 A2 | 12/2012 |
|---|---|---|
| EP | 3 241 995 A1 | 11/2017 |

*Primary Examiner* — Michael Lebentritt
(74) *Attorney, Agent, or Firm* — Brinks Gilson & Lione (57) ABSTRACT

A vane stage segment is provided including an outer wall segment, an inner wall segment, and an airfoil. The outer wall segment is configured to be coupled to other outer wall segments to form an outer wall of the vane stage. The inner wall segment is spaced radially inward from the outer wall segment. At least one of the inner wall segment or the outer wall segment is separable between a forward portion and an aft portion. The airfoil extends between the outer wall segment and the inner wall segment.

19 Claims, 7 Drawing Sheets

(56) References Cited

U.S. PATENT DOCUMENTS

| | | | |
|---|---|---|---|
| 9,856,747 B2 | 1/2018 | Davis et al. | |
| 2006/0228211 A1* | 10/2006 | Vance | F01D 5/14 |
| | | | 415/200 |
| 2010/0189556 A1* | 7/2010 | Propheter-Hinckley | F01D 5/284 |
| | | | 415/200 |
| 2013/0004331 A1* | 1/2013 | Beeck | F01D 5/143 |
| | | | 416/97 R |
| 2013/0323073 A1* | 12/2013 | McCaffrey | F01D 5/147 |
| | | | 416/241 B |
| 2013/0330196 A1* | 12/2013 | Brown | F01D 5/147 |
| | | | 416/219 R |
| 2015/0017007 A1* | 1/2015 | Brandl | F01D 5/147 |
| | | | 416/223 A |
| 2015/0226073 A1* | 8/2015 | Batt | F01D 5/08 |
| | | | 415/116 |
| 2015/0369072 A1* | 12/2015 | Bareiss | B23K 26/382 |
| | | | 415/115 |
| 2016/0032764 A1 | 2/2016 | Tibbott et al. | |
| 2016/0090851 A1* | 3/2016 | Carr | F01D 9/041 |
| | | | 415/208.1 |
| 2016/0153294 A1 | 6/2016 | Graf et al. | |
| 2016/0348589 A1* | 12/2016 | Patel | B64D 33/00 |
| 2017/0292403 A1 | 10/2017 | Schlemmer et al. | |
| 2018/0021899 A1* | 1/2018 | Koehne | F01D 9/042 |
| | | | 29/889.21 |
| 2018/0195400 A1* | 7/2018 | Granberg | F01D 5/186 |
| 2018/0209283 A1* | 7/2018 | Kottilingam | F01D 9/041 |
| 2018/0334921 A1* | 11/2018 | Carugno | F01D 5/146 |
| 2019/0292922 A1* | 9/2019 | Freeman | F01D 5/147 |

\* cited by examiner

SEPARABLE TURBINE VANE STAGE

GOVERNMENT LICENSE RIGHTS

This invention was made with government support under contract FA8650-07-C-2803 awarded by the United States Air Force Research Laboratory. The government has certain rights in the invention.

TECHNICAL FIELD

This disclosure relates to turbines for gas turbine engines, and, in particular to vane stages within turbines.

BACKGROUND

Turbine sections of gas turbine engines typically include multiple stages of vanes. Vanes within the turbine section may be intermittently exposed to high thermal stress over a long period of time. Failure to one portion of a vane stage often requires complete replacement of the vane stage.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Typically, the temperature of gases within a turbine section of a gas turbine engine are as high as possible to maximize efficiency of the gas turbine engine. Furthermore, thermal stress within the turbine section may not be uniform, causing increased wear on different portions of the vane stages. Failure of any portion of a vane, a vane stage segment, or a vane stage may require replacement of the entire vane stage or vane stage segment. Therefore, it is desirable that components of the vane stage may be easily changed to increase the life of the vane stage and decrease maintenance costs associated with operation of the gas turbine engine.

The following description is merely exemplary in nature and is not intended to limit the present disclosure, application, or uses.

By way of an introductory example, a vane stage segment is provided including an outer wall segment, an inner wall segment, and an airfoil. The outer wall segment is configured to be coupled to other outer wall segments to form an outer wall of the vane stage. The inner wall segment is spaced radially inward from the outer wall segment. At least one of the inner wall segment or the outer wall segment is separable between a forward portion and an aft portion. The airfoil extends between the outer wall segment and the inner wall segment.

One interesting feature of the systems and methods described below may be that the vane stage segments, outer wall segments, inner wall segments, forward portions, and aft portions may be easily interchangeable to repair worn or damaged areas of the vane stages. Such replacements may increase the life of the vane stage and of the turbine section generally. Alternatively, or in addition, an interesting feature of the systems and methods described below may be that the vane stage segments may be similar or identical in design, reducing the maintenance cost for the vane stages or turbine section.

Figure 1:
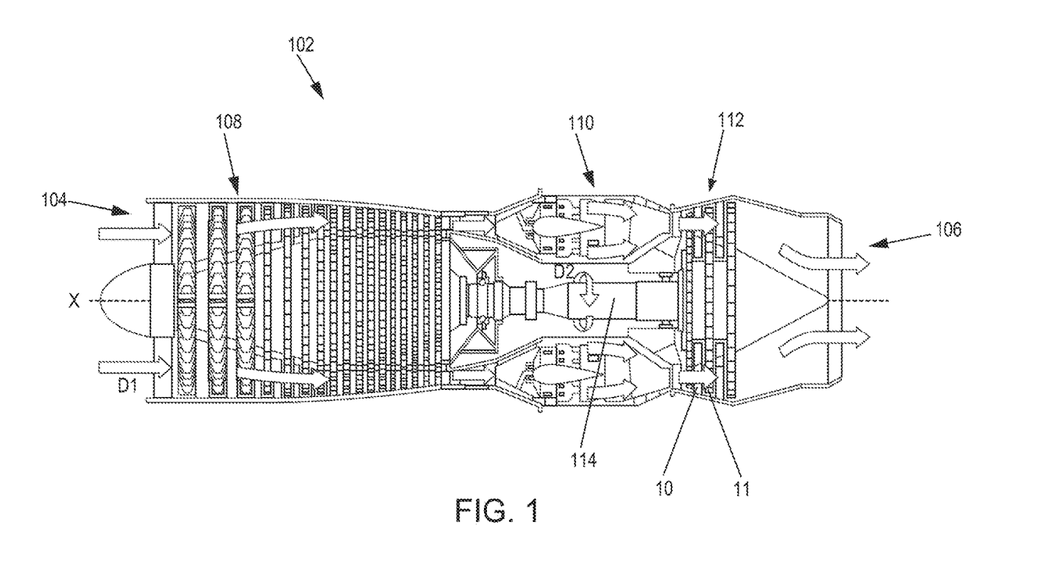
FIG. 1 illustrates a cross-sectional view of an example of a gas turbine engine.

FIG. 1 illustrates a cross-sectional view of a gas turbine engine 102 for propulsion of, for example, an aircraft. Alternatively or in addition, the gas turbine engine 102 may be used to drive a propeller in aquatic applications, or to drive a generator in energy applications. The gas turbine engine 102 may include an intake section 104, a compressor section 108, a combustor section 110, a turbine section 112, and an exhaust section 106. During operation of the gas turbine engine 102, fluid received from the intake section 104, such as air, travels along the direction D1 and may be compressed within the compressor section 108. The compressed fluid may then be mixed with fuel and the mixture may be burned in the combustor section 110. The combustor section 110 may include any suitable fuel injection and combustion mechanisms. The hot, high pressure fluid may then pass through the turbine section 112 to extract energy from the fluid and cause the turbine section 112 to rotate, which in turn drives the a shaft 114 which drives the compressor section 108. The turbine section 112 may contain one or more vane stages 10, which each contain multiple stationary airfoils (18 in FIG. 2), and one or more blade stages 11. The vane stages 10 may be any component which directs the flow of fluid through a portion of the turbine section. Examples of the vane stages 10 may include the inlet vane stage, the exhaust vane stage, or any other vane stages in the turbine section 112. The airfoil 18 may be any component which is shaped to direct the flow of fluid. Examples of the airfoil 18 may include a planar wall, a vane, or a highly cambered sheet. Discharge fluid may exit the exhaust section 106.

The shaft 114 may rotate around an axis of rotation, which may correspond to a centerline X in some examples. The centerline X may be a longitudinal axis which extends across the entire length of the shaft 114, along the axis of rotation. For the purposes of this application, the terms "radially outer" and "radially outward" may describe the position of an element with respect to its distance away from the centerline X of the gas turbine engine 102 or the center of the shaft 114. The terms "radially inner" and "radially inward" may describe the position of an element with respect to its distance toward the centerline X of the gas turbine engine 102 or the center of the shaft 114. A "downstream" direction may be any direction toward the exhaust section 106 of the gas turbine engine 102. An "upstream" direction may be any direction toward the intake section 104 of the gas turbine engine 102.

Figure 2:
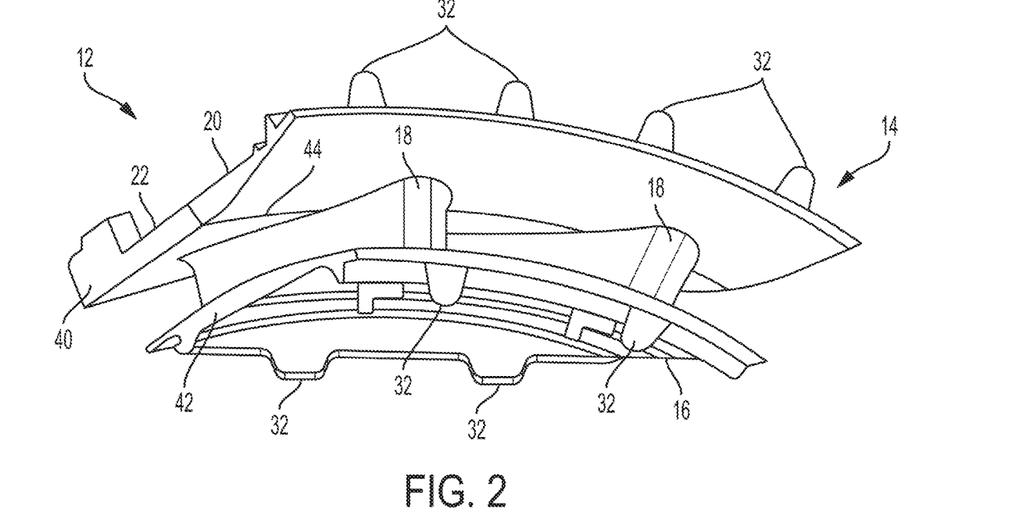
FIG. 2 illustrates a perspective front view of a first example of a vane stage segment.
Figure 3:
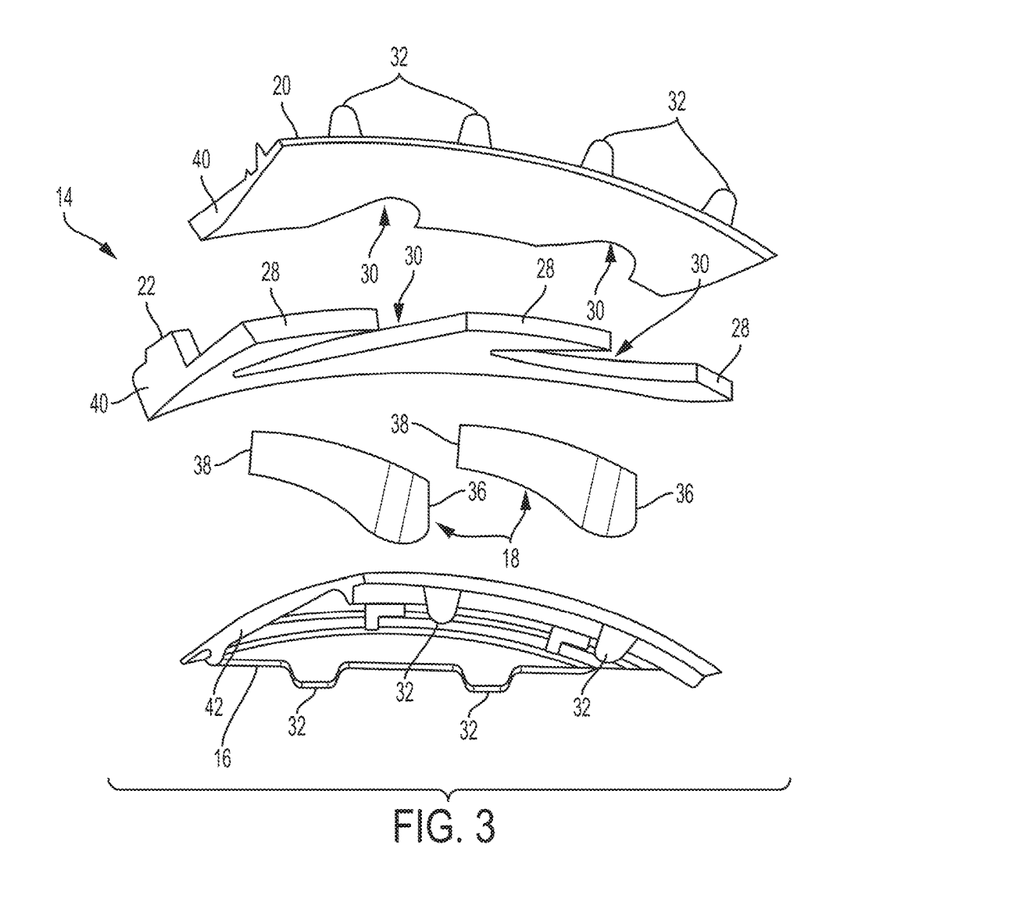
FIG. 3 illustrates an exploded view of the first example of the vane stage segment including a forward portion of an outer wall segment, an aft portion of an outer wall segment, an inner wall segment, and a plurality of airfoils.

FIG. 2 illustrates a perspective view of an example of a vane stage segment 12. FIG. 3 illustrates an exploded view of the vane stage segment 12 of FIG. 2 including an outer wall segment 14, an inner wall segment 16, and airfoils 18. The outer wall segment 14 may be any component which may be coupled to other outer wall segments 14 to form an outer wall of the vane stage 10. Examples of the outer wall segment 14 may include a curved shell, a plate, or a panel. The outer wall segment 14 may be made of any material which may provide structural support to the vane stage 10 and which may withstand the high temperatures of fluids passing through the turbine section 112, such as a ceramic matrix composite material or a metal such as titanium or a nickel superalloy.

The inner wall segment 16 may be any component which may be coupled to other inner wall segments 16 to form an inner wall of the vane stage 10. Examples of the inner wall segment 16 may include a curved shell, a plate, or a panel. The inner wall segment 16 may be made of any material which may provide structural support to the vane stage 10 and which may withstand the high temperatures of fluids passing through the turbine section 112, such as a ceramic matrix composite material or a metal such as titanium or a nickel superalloy. The inner wall segment 16 may be spaced radially inward from the outer wall segment 14 toward a center of the vane stage 10.

The outer wall segment 14 and the inner wall segment 16 may include openings 30 to receive the airfoils 18. The openings 30 may have the same shape as the airfoil 18, may be larger than the cross-section of the airfoil 18 or may be smaller than the cross-section of the airfoil 18. The openings 30 may completely encircle the airfoils 18 or may only partially encircle the airfoils 18. In embodiments where the outer wall segment 14 or the inner wall segment 16 extends around the entire circumference, each may have between 12-40 airfoils 18. In embodiments where the outer wall comprises multiple outer wall segments 14 or the inner wall comprises multiple inner wall segments 16, each outer wall segment 14 or inner wall segment 16 may include between 1-20 airfoils 18.

The airfoils 18 may be made of any material which may provide structural support to the vane stage 10 and which may withstand the high temperatures of fluids passing through the turbine section 112, such as a ceramic matrix composite material or a metal such as titanium or a nickel superalloy. The airfoils 18 may be made from a different material than the outer wall segment 14 and the inner wall segment 16. For example, the airfoils 18 may be made from a ceramic matrix composite material and the outer wall segments 14 and inner wall segments 16 may be made from a metal. The airfoil 18 may extend from a leading end 36, located at the furthest point upstream on the airfoil 18, to a trailing end 38, located at the furthest point downstream on the airfoil 18.

In some embodiments the outer wall segment 14 may be separable between a forward portion 20 and an aft portion 22. The forward portion 20 may be any portion which is located upstream from the aft portion 22. The aft portion 22 may be any portion which is located downstream from the forward portion 20. The forward portion 20 may comprise between 20%-80% of the outer wall segment 14. The aft portion 22 may comprise between 20%-80% of the outer wall segment 14. Each of the forward portion 20 and aft portion 22 may include an interfacing surface 28 allowing the forward portion 20 and the aft portion 22 to be coupled together. Examples of the interfacing surfaces 28 may include a smooth surface, a curved surface, or a slot and projection connection. The interfacing surfaces 28 may meet to form a joint 44 between the forward portion 20 and the aft portion 22. The openings 30 of the outer wall segment 14 may be split between the forward portion 20 and aft portion 22. The forward portion 20 and aft portion 22 may be removed and replaced independently of one another, reducing maintenance cost.

The outer wall segment 14 and the inner wall segment 16 may include stage flanges 32 to couple the vane stage 10 to other portions of the turbine section 112. The stage flange 32 may be any portion of the outer wall segment 14 or inner wall segment 16 positioned at the upstream end or downstream end of the vane stage 10. Examples of the stage flange 32 may include a projection, a tab, or a rim. Stage flanges 32 associated with the outer wall segment 14 may project radially outward from the outer wall segment 14. Stage flanges 32 associated with the inner wall segment 16 may project radially inward from the inner wall segment 16. The stage flanges 32 may be coupled with stage flanges 32 from other vane stages 10, blade stages, or the combustor section 110. The stage flanges 32 may be integral to the inner wall segment 16 or the outer wall segment 14 and may be made of the same material as the inner wall segment 16 or the outer wall segment 14.

The outer wall segment 14 may include a side surface 40 which may be coupled to other side surfaces 40 of adjacent outer wall segments 14. Examples of the side surface 40 may include a smooth surface, a curved surface, or a slot and projection connection. The inner wall segment 16 may also include a side surface 42 which may be coupled to other side surfaces 42 of other inner wall segments 16. Examples of the side surface 42 may include a smooth surface, a curved surface, or a slot and projection connection.

Figure 4:
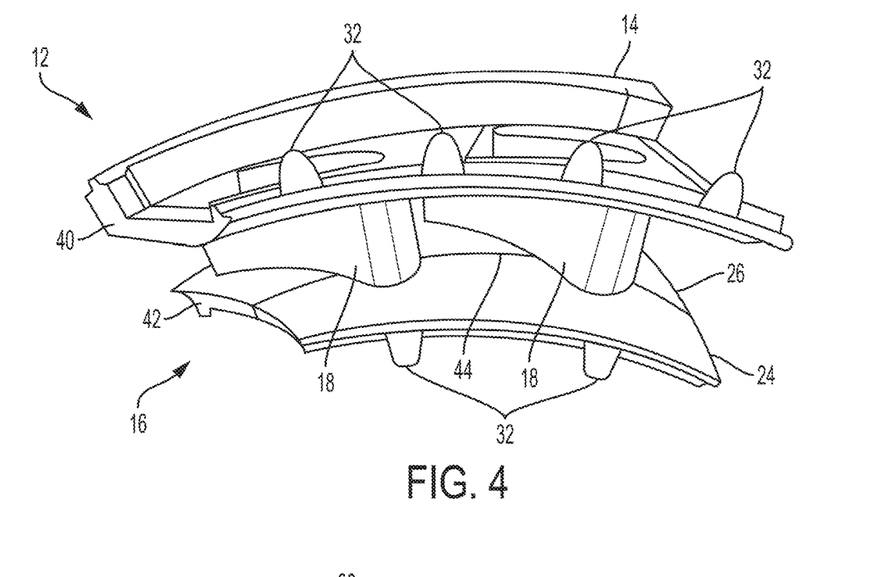
FIG. 4 illustrates a perspective front view of a second example of a vane stage segment.
Figure 5:
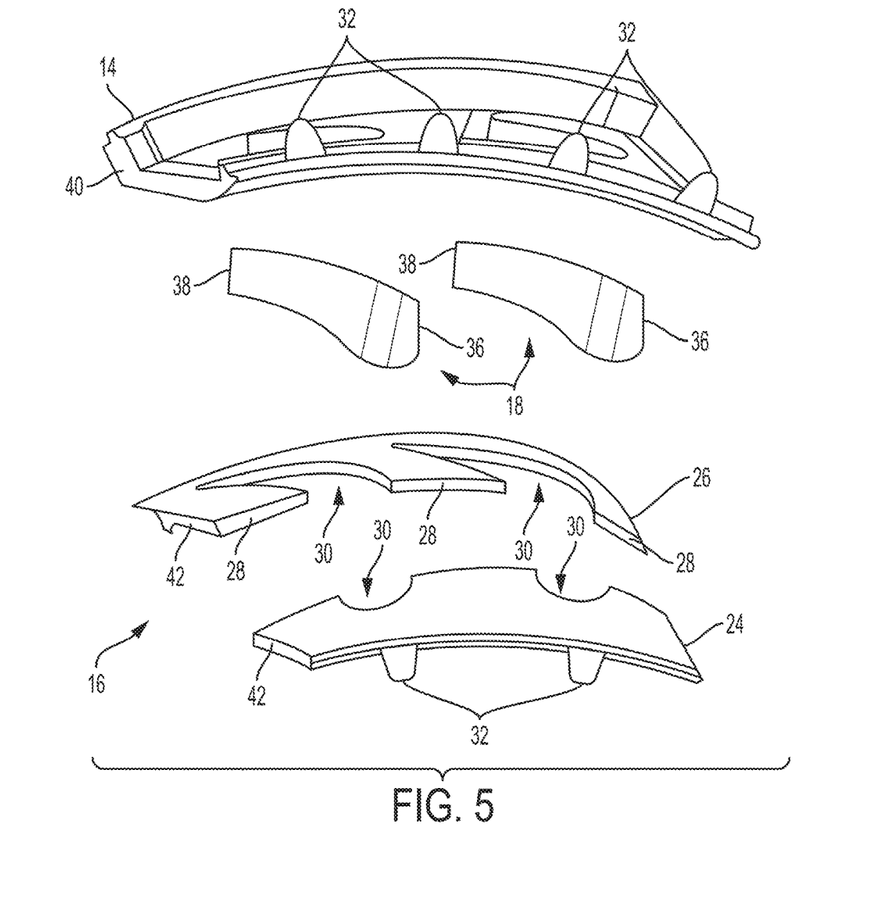
FIG. 5 illustrates an exploded view of the second example of the vane stage segment including a forward portion of an inner wall segment, an aft portion of an inner wall segment, an outer wall segment, and a plurality of airfoils.

FIG. 4 illustrates a perspective view of another example of the vane stage segment 12. FIG. 5 illustrates an exploded view of the vane stage segment 12 of FIG. 4 including the outer wall segment 14, the inner wall segment 16, and airfoils 18. As shown in FIG. 5, the inner wall segment 16 may also be separable between a forward portion 24 and an aft portion 26. The forward portion 24 may be any portion which is located upstream from the aft portion 26. The forward portion 24 may comprise between 20%-80% of the inner wall segment 16. The aft portion 26 may be any portion which is located downstream from the forward portion 24. The aft portion 26 may comprise between 20%-80% of the inner wall segment 16. Each of the forward portion 24 and aft portion 26 may include interfacing surfaces 28 allowing the forward portion 24 and the aft portion 26 to be coupled together. The interfacing surfaces 28 may meet to form the joint 44 between the forward portion 24 and the aft portion 26. The openings 30 of the inner wall segment 16 may be split between the forward portion 24 and aft portion 26. The forward portion 24 and aft portion 26 may be removed and replaced independently of one another, reducing maintenance cost.

In some embodiments, the outer wall segment 14 may be separable between a forward portion 20 and an aft portion 22, and the inner wall segment 16 may also be separable between a forward portion 24 and an aft portion 26. Such an embodiment may allow for easily removal and replacement of damaged portions of the outer wall segment 14, the inner wall segment 16, and the airfoils 18.

Figure 6:
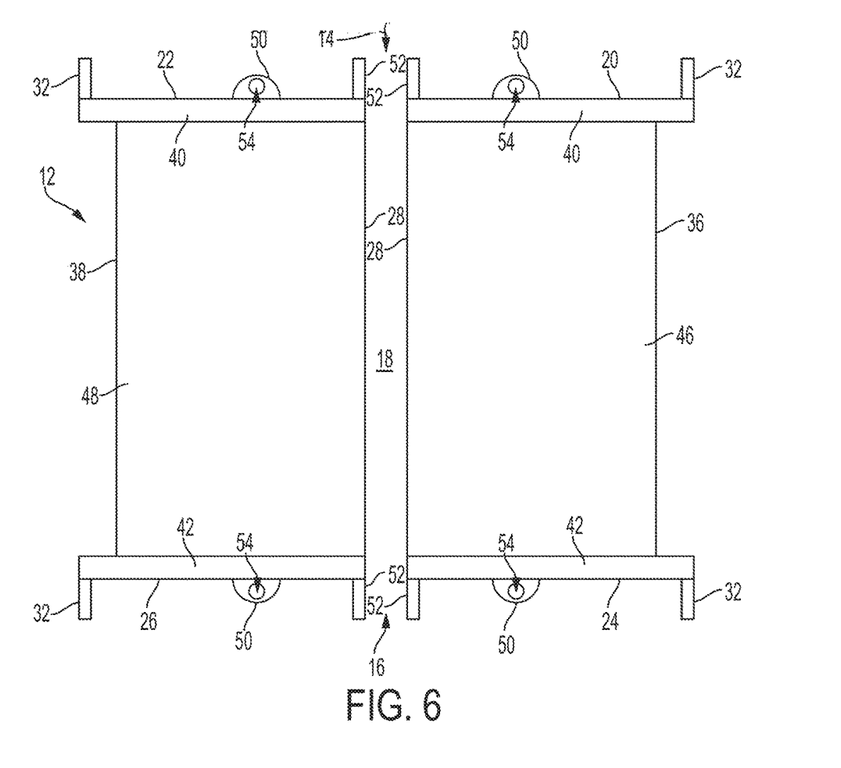
FIG. 6 illustrates a side plan view of a third example of a vane stage segment.

FIG. 6 illustrates a side view of another example of the vane stage segment 12. As illustrated, in some embodiments, the entire vane stage segment 12 may be separable between a forward portion and an aft portion. The forward portion of the vane stage segment 12 may include the forward portion 20 of the outer wall segment 14, the forward portion 24 of the inner wall segment 16, and a forward portion 46 of the airfoil 18. The aft portion of the vane stage segment 12 may include the aft portion 22 of the outer wall segment 14, the aft portion 26 of the inner wall segment 16, and an aft portion 48 of the airfoil 18. The forward portion 46 of the airfoil 18 may be any portion of the airfoil extending from the leading end 36 of the airfoil 18. The aft portion 48 of the airfoil 18 may be any portion of the airfoil 18 which extends to the trailing end 38 of the airfoil 18. The forward portion 46 may comprise between 20%-80% of the airfoil 18. The aft portion 48 may comprise between 20%-80% of the airfoil 18. The forward portion of the vane stage segment 12 may be an unitary single body formed from a single casting, or may further separable into smaller components. Similarly, the aft portion of the vane stage segment 12 may be an unitary single body formed from a single casting, or may further separable into smaller components.

The interfacing surface 28 between the forward portion and the aft portion of the vane stage segment 12 may extend continuously from the outer wall segment 14, across the airfoil 18, and to the inner wall segment 16. Each of the forward portion and the aft portion of the vane stage segment 12 may include portion flanges 52 to couple the forward portion to the aft portion. The portion flanges 52 may be any structure which extend radially from the inner wall segment 16 or the outer wall segment 14. Examples of the portion flanges 52 may include protrusions, projections, or rims. The portion flanges 52 on the inner wall segment 16 may extend radially inward from the inner wall segment 16. The portion flanges 52 on the outer wall segment 14 may extend radially outward from the outer wall segment 14. The portion flanges 52 may be integral to the inner wall segment 16 or the outer wall segment 14 and may be made of the same material as the inner wall segment 16 or the outer wall segment 14.

Each of the forward portion and the aft portion of the vane stage segment 12 may include side flanges 50 to couple the vane stage segment 12 to adjacent vane stage segments 12. The side flanges 50 may be any structure which extend radially from the inner wall segment 16 or the outer wall segment 14. Examples of the side flanges 50 may include protrusions, projections, or rims. The side flanges 50 on the inner wall segment 16 may be located at or near the side surface 42 of the inner wall segment 16 and may extend radially inward from the inner wall segment 16. The side flanges 50 on the outer wall segment 14 may be located at or near the side surface 40 of the outer wall segment 14 and may extend radially outward from the outer wall segment 14. The side flanges 50 may be integral to the inner wall segment 16 or the outer wall segment 14 and may be made of the same material as the inner wall segment 16 or the outer wall segment 14.

Each of the stage flanges 32, the side flanges 50, and the portion flanges 52 may include flange openings 54 which extend through the flange. Examples of the flange openings 54 may include channels, apertures, or passageways.

Figure 7:
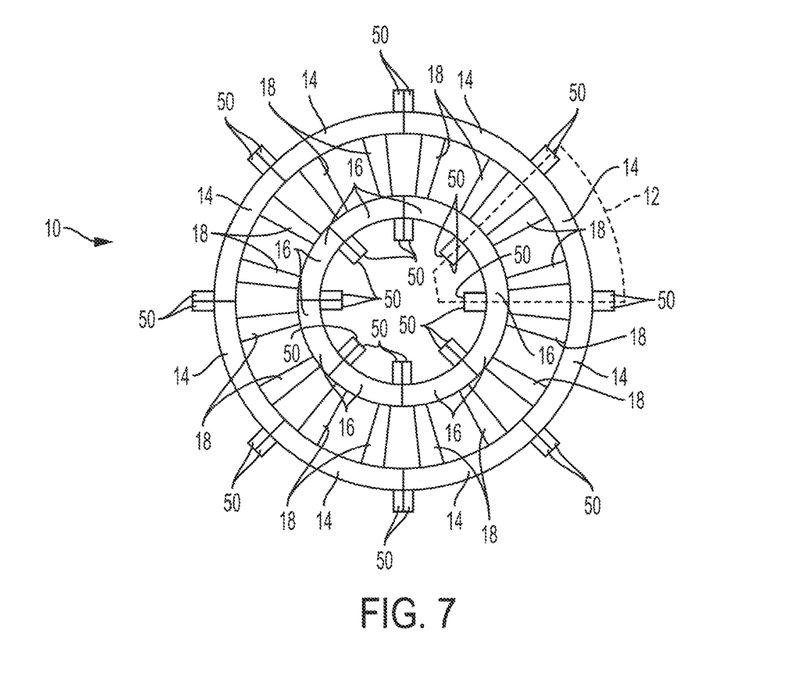
FIG. 7 illustrates a front plan view of an example of a vane stage.

FIG. 7 illustrates an example of the vane stage 10 with multiple vane stage segments 12. In some embodiments, the inner wall of the vane stage 10 may be a single segment extending about an inner circumference of the vane stage 10. Similarly, in some embodiments, the outer wall of the vane stage 10 may be a single segment extending about an outer circumference of the vane stage 10. However, as illustrated in FIG. 7, the outer wall may include a number of outer wall segments 14 extending about the outer circumference of the vane stage 10 and the inner wall may include a number of inner wall segments 16 extending about the inner circumference of the vane stage 10. The outer wall segments 14 may be coupled together with fasteners such as nuts (78 in FIG. 8) and bolts (76 in FIG. 8) at the side flanges 50. Similarly, the inner wall segments 16 may be coupled together with fasteners such as nuts 78 and bolts 76.

Each outer wall segment 14 may be identical and easily separable from the vane stage 10. Each inner wall segment 16 may be identical and easily separable from the vane stage 10. Such a configuration may reduce the cost of maintaining the vane stage 10, as outer wall segments 14 and inner wall segments 16 may be simply replaced when worn or damaged. Particularly where complex cooling channels (94 in FIG. 10) have been created in the outer wall segments 14 or the inner wall segments 16, manufacturing identical outer wall segments 14 and inner wall segments 16 may be cost effective.

Figure 8:
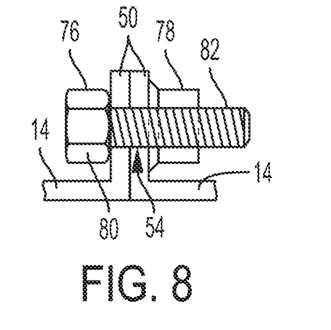
FIG. 8 illustrates a cross-sectional side view of an example of a bolt and a nut.

FIG. 8 illustrates the bolt 76 and the nut 78 as an example of the fastener which may couple together adjacent outer wall segments 14, adjacent inner wall segments 16, adjacent stages 10, 11 of the turbine section 112, as well as forward portions and aft portions of the vane stage 10. For example, as illustrated in FIG. 8, the bolt 76 may include a stem 82 which passes through the flange openings 54 of the side flanges 50. The stem 82 may be any object which is sized to pass through the flange openings 54 and which may be coupled to the nut 78. Examples of the stem 82 may include a threaded cylinder, a slotted cone, or any other type of projection. The head 80 of the bolt 76 may be any portion of the bolt 76 which is sized to rest against one of the side flanges 50 when the stem 82 has passed through the flange openings 54. Examples of the head 80 may include a cylinder, a hexagonal slab, or a bar. The nut 78 may be advanced onto the stem 82 and secured such that the side flanges 50 are secured between the head 80 of the bolt 76 and the nut 78. The bolt 76 and nut 78 may be made of any material capable of withstanding the thermal and mechanical stresses on the stage flanges during operation, such as stainless steel, tungsten, or a nickel superalloy. The nut 78 and bolt 76 may be loosened and separated to remove and replace any of the outer wall segments 14.

Figure 9:
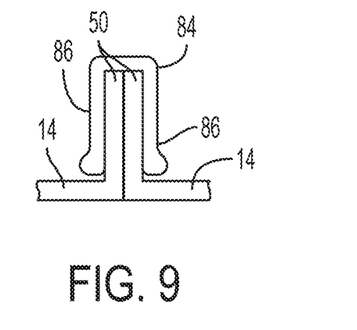
FIG. 9 illustrates a cross-sectional side view of an example of a clamp.

Other similar fasteners may be used instead of bolts 76 and nuts 78. For example, a rivet may be advanced through the flange openings 54 and expanded to couple the side flanges 50. Alternatively, as illustrated in FIG. 9, a clamp 84 may be used to couple together the side flanges 50. The clamp 84 may be any object which extends around two side flanges 50 to couple together the side flanges 50. Examples of the clamp 84 may include a clip, a crimped sleeve, or a compressible cap. The clamp 84 may have one or more sidewalls 86 which can be secured against the surfaces of the side flanges 50. In some embodiments, the side flanges 50 and the sidewalls 86 may be shaped such that clamp 84 may be crimped around the side flanges 50 after it has been extended over them.

Figure 10:
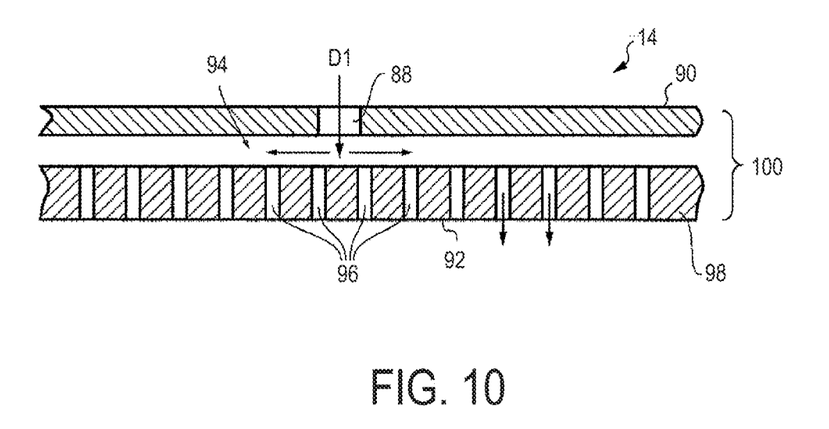
FIG. 10 illustrates a cross-sectional side view of an example of an outer wall segment.

FIG. 10 illustrates a partial cross-sectional side view of an example of a cooling system 100 within the interior 98 of the outer wall segment 14. In some embodiments, the outer wall segment 14 may include a cooling channel 94 running through the interior 98 of the outer wall segment 14. The cooling channel 94 may be any passage through which fluid can flow to cool the outer wall segment 14. Examples of the cooling channel 94 may include a passageway, a tube, or a complex network of pathways. Fluid may enter the cooling channel 94 through a port 88 in an exterior surface 90 of the outer wall segment 14. Examples of the port 88 may include an opening, an aperture, or an inlet. Fluid passing through the cooling channel 94 may be provided from the compressor section 108. Fluid passing through the cooling channel 94 may remove heat from the outer wall segment 14 through convection. The fluid in the cooling channel 94 may exit the cooling channel 94 through an outlet 96 in the interior 98 of the outer wall segment 14. Examples of the outlet 96 may be openings, apertures, or a port. The outlet 96 may deliver fluid from the cooling channel 94 into the turbine section 112. In some embodiments, the outer wall segment 14 may include multiple cooling channels 94 having multiple ports 88 and multiple outlets 96. A similar cooling channel 94 may be formed into the interior 98 of the inner wall segments 16.

In some embodiments, the cooling channel 94 may be formed into the interior 98 of the outer wall segments 14 through machining. Alternatively, more complex and more extensive cooling channels 94 may be formed as the outer wall segment 14 is being formed through additive layer manufacturing. If the cooling channel 94 is designed to effectively cool the portions of the outer wall segment 14 under the most thermal stress, more cost effective materials, such as metals, may be used for the outer wall segment 14 over more complicated designs involving ceramics and ceramic-plated metals. Similar processes may be used to form a cooling channel 94 in the interior 98 of the inner wall segments 16.

Figure 11:
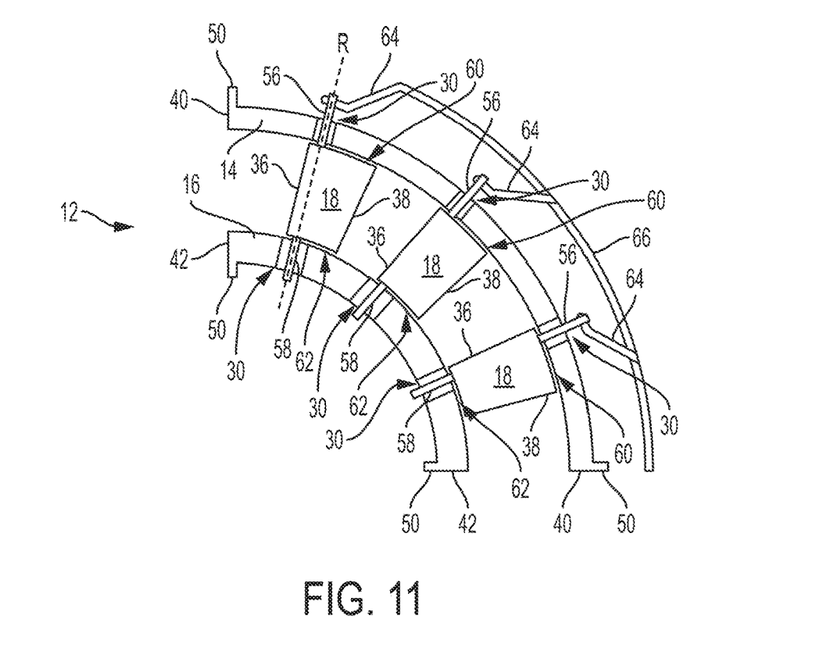
FIG. 11 illustrates a partial cross-sectional side view of a fourth example of a vane stage segment.

FIG. 11 illustrates an example of the vane stage segment 12 including rotatable airfoils 18. The airfoils 18 may each include an outer projection 56 and an inner projection 58. The outer projection 56 may be any component of the airfoil 18 which extends into the opening 30 in the outer wall segment 14. Examples of the outer projection 56 may include a tab, a cylinder, or a protrusion. The inner projection 58 may be any component of the airfoil 18 which extends into the opening 30 in the inner wall segment 16. Examples of the inner projection 58 may include a tab, a cylinder, or a protrusion. The outer projection 56 and the inner projection 58 may be aligned along an axis of rotation R about which, the inner projection 58, the outer projection 56, and the airfoil 18 are rotatable. The axis of rotation R may pass through a portion of the airfoil 18 such as adjacent to the leading end 36, the center of aerodynamic forces on the airfoil 18, the center of mass of the airfoil 18, or the midpoint between the leading end 36 and the trailing end 38. The airfoils 18 may be rotatable to change the angle of attack at which fluid passes over the airfoil 18 when passing through the vane stage 10. Rotation of the airfoils 18 within the vane stage 10 may be useful to increase efficiency of the turbine section 112 under varying operating pressures and temperatures.

In some embodiments, the outer projection 56 and the inner projection 58 may have a cross-sectional area which is less than a cross-sectional area of the airfoil 18. In such embodiments, an outer gap 60 may be defined between the airfoil 18 and the outer wall segment 14 and an inner gap 62 may be defined between the airfoil 18 and the inner wall segment 16. The outer gap 60 and inner gap 62 may be large enough to allow rotation of the airfoil 18 but may also be small enough to minimize fluid flow through the inner gap 62 and outer gap 60.

The outer projection 56 and the inner projection 58 may extend through the openings 30 in the outer wall segment 14 and inner wall segment 16, respectively. As illustrated in FIG. 11, the outer projection 56 may be coupled to a control arm 66 via a rod 64. The inner projection 58 may be secured to the inner wall segment 16 by a bearing. The control arm 66 may be any device which can be used to control the rotation of an airfoil 18 within the vane stage 10 from outside of the vane stage 10. Examples of the control arm 66 may be a lever, a handle, or an arm extending circumferentially outside the vane stage 10. The control arm 66 may be coupled to every airfoil 18 within the vane stage 10 or may be coupled to a single airfoil 18. The rod 64 may be any device which may be used to couple the outer projection 56 of the airfoil 18 to the control arm 66. Examples of the rod 64 may include a lever, a bar, or a gear. In one embodiment, rotation of the control arm 66 about the outside of the vane stage 10 rotates the rods 64 causing coordinated rotation of the airfoils 18 within the vane stage 10. In some embodiments the control arm 66 may be positioned on the interior of the vane stage 10, radially inward from the inner wall segment 16. In such an embodiment, the control arm 66 may be coupled to the inner projections 58 to control rotation of the airfoils 18.

The position of the outer projection 56 within the outer wall segment 14 and of the inner projection 58 within the inner wall segment 16 may be fixed by several possible devices. For example, a snap ring may be fitted onto the outer projection 56 to fix the position of the outer projection 56 within the opening 30 of the outer wall segment 14 and to at least partially seal the opening 30 of the outer wall segment 14. Other devices such as bolts, rivets, clamps, marman clamps, or spiral locks may also be used.

Figure 12:
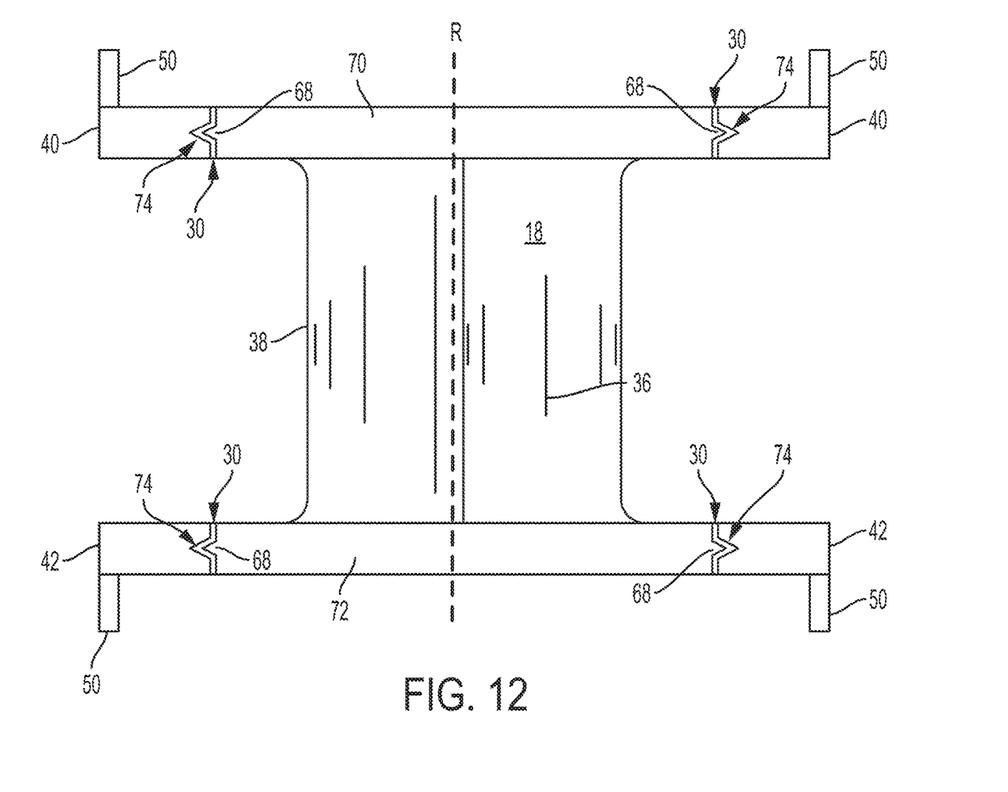
FIG. 12 illustrates a partial cross-sectional front view of a fifth example of a vane stage segment.

FIG. 12 illustrates a front partial cross-sectional view of another embodiment of the vane stage segment 12. As illustrated, the airfoil 18 may include an outer endwall 70 and an inner endwall 72. The outer endwall 70 may be any portion of the airfoil 18 which may be positioned within the opening 30 of the outer wall segment 14. Examples of the outer endwall 70 may be a panel, a cam, or a flange. The inner endwall 72 may be any portion of the airfoil 18 which may be positioned within the opening 30 of the inner wall segment 16. Examples of the inner endwall 72 may be a panel, a cam, or a flange. Both the outer endwall 70 and the inner endwall 72 may have a cross-sectional area which is larger than the airfoil 18.

The outer endwall 70 may be coupled to the outer wall segment 14 by a projection 68 and groove 74 connection. For example, the projection 68 may project outwardly from the side of the outer endwall 70 and the groove 74 may be formed into the opening 30 of the outer wall segment 14. Alternatively, the projection 68 may project outwardly from the side of the opening 30 and the groove 74 may be formed into the side of the outer endwall 70. A similar projection 68 and groove 74 may also be used to connect the inner endwall 72 and the inner wall segment 16. The projection 68 and groove 74 connections may allow rotation of the airfoil 18 about the axis of rotation R.

Figure 13:
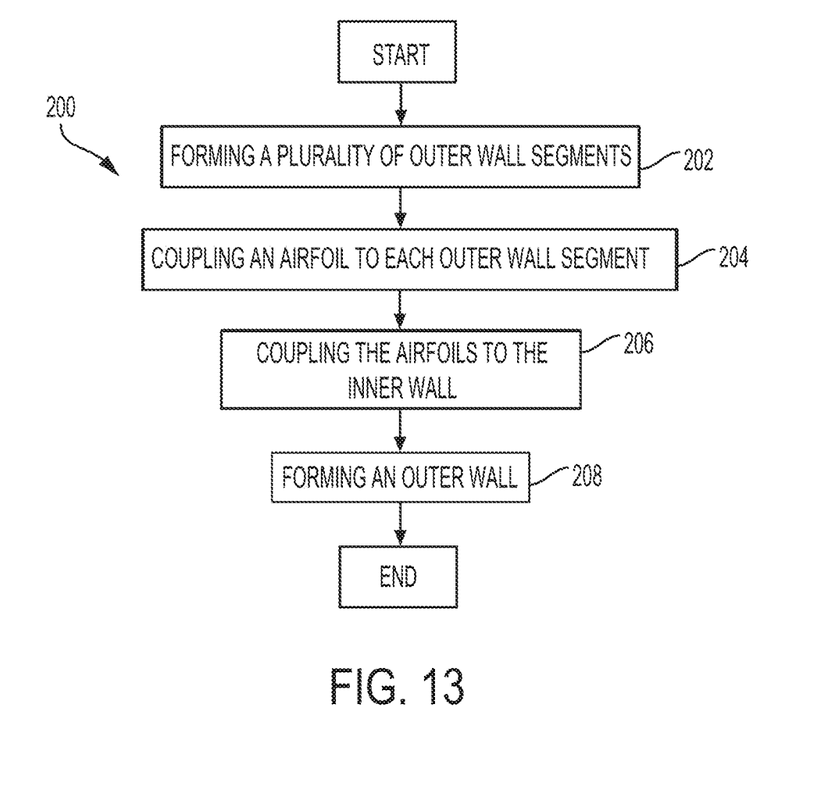
FIG. 13 illustrates a flow diagram of an example of a method of manufacturing a vane stage.

FIG. 13 illustrates a flow diagram of an example of a method of manufacturing the vane stage 10 for use in the turbine section 112 of the gas turbine engine 102 (200). The steps may include additional, different, or fewer operations than illustrated in FIG. 13. The steps may be executed in a different order than illustrated in FIG. 13.

The method (200) includes forming a plurality of outer wall segments 14 by coupling the forward portion 20 of each outer wall segment 14 to an aft portion 22 of each outer wall segment 14 (202). The outer wall segments 14 may be formed by additive layer manufacturing or by metal casting in a wax mold. The method (200) may also include coupling the airfoil 18 to each of the plurality of outer wall segments 14 (204), and coupling the airfoil 18 to the inner wall segment 16 (206). The method (200) may also include forming the outer wall of the vane stage 10 by coupling each of the outer wall segments 14 to adjacent outer wall segments 14 about the circumference of the vane stage 10 (208). Fasteners may be used to couple the outer wall segments 14 to adjacent outer wall segments 14, to couple the forward portion 20 of the outer wall segment 14 to the aft portion 22 of the outer wall segment 14, to couple the airfoils 18 to the outer wall segments 14, and to couple the airfoils 18 to the inner wall segment 16.

Additionally, the fasteners may be uncoupled from any of the outer wall segments 14 in order to remove and replace the outer wall segments 14. Similar steps may be taken to replace inner wall segments 16 and the airfoils 18.

Each component may include additional, different, or fewer components. For example, the ports 88 and cooling channels 94 may not be included in some embodiments of the outer wall segments 14. Additionally, in some embodiments, the inner wall of the vane stage 10 may not be divided into multiple inner wall segments 16, and the outer wall of the vane stage 10 may not be divided into multiple outer wall segments 14. Additionally, in some embodiments, the side flanges 50 may not be present as adjacent vane stage segments 12 may be fixed within the vane stage 10 in other ways, such as seal strips.

The method (200) may be implemented with additional, different, or fewer components. For example, the method (200) may include coupling the control arm 66 to at least a portion of the airfoils 18 such that movement of the control arm 66 rotates the portion of the airfoils 18.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A vane stage segment for use in a vane stage of a turbine engine, comprising:

an outer wall segment configured to be coupled to other outer wall segments to form an outer wall of the vane stage, an inner wall segment spaced radially inward from the outer wall segment; wherein at least one of the inner wall segment or the outer wall segment is separable between a forward portion and an aft portion; and an airfoil extending between the outer wall segment and the inner wall segment.

2. The vane stage segment of aspect 1, comprising a plurality of airfoils extending between the outer wall segment and the inner wall segment.

3. The vane stage segment of aspects 1-2, wherein the forward portion comprises a flange, the aft portion comprises a flange, and the forward portion is configured to be secured to the aft portion by a fastener.

4. The vane stage segment of aspect 3, wherein the fastener is a bolt and nut.

5. The vane stage segment of aspects 1-4, wherein the outer wall segment is separable between the forward portion and the aft portion.

6. The vane stage segment of aspect 5, wherein the inner wall segment separable between the forward portion and the aft portion.

7. The vane stage segment of aspects 1-6, wherein the airfoil is separable from the outer wall segment and the inner wall segment.

8. The vane stage segment of aspect 7, wherein the airfoil comprises an outer endwall configured to be received within an opening formed in the outer wall segment, the outer endwall having a larger cross-sectional area than the airfoil.

9. The vane stage segment of aspect 1, wherein a forward portion of the vane stage segment is unitary body comprising the forward portion of the outer wall segment, the forward portion of the inner wall segment, and a forward portion of airfoil;

wherein an aft portion of the vane stage segment is unitary body comprising the aft portion of the outer wall segment, the aft portion of the inner wall segment, and an aft portion of the airfoil; and the forward portion of the vane stage segment may be coupled to the aft portion of the vane stage segment.

10. A vane stage for use in a turbine engine, comprising:

an outer wall comprising a plurality of outer wall segments coupled together circumferentially about a center of the vane stage, wherein each of the outer wall segments comprises an aft portion and a forward portion, each forward portion being coupled to each aft portion by a fastener;

an inner wall spaced radially inward from the outer wall and extending circumferentially about the center of the vane stage; and a plurality of airfoils spaced circumferentially about the center of the vane stage, each airfoil extending from the inner wall to the outer wall.

11. The vane stage of aspect 10, wherein each airfoil comprises an outer projection extending into one of the plurality of outer wall segments, wherein each airfoil is rotatable about the outer projection.

12. The vane stage of aspect 11, further comprising a control arm coupled to the outer projections of at least two of the airfoils, wherein the control arm is configured to coordinate the rotation of the airfoils coupled to the control arm.

13. The vane stage of aspects 10-12, wherein each airfoil comprises an outer endwall positioned within an opening formed in one of the outer wall segments wherein the outer endwall of each airfoil is rotatable within the opening.

14. The vane stage of aspects 10-13, wherein each outer wall segment is coupled to adjacent outer wall segments by a plurality of fasteners.

15. A method of manufacturing a vane stage for use in a turbine engine, comprising:
forming a plurality of outer wall segments by coupling a forward portion of each outer wall segment to an aft portion of each outer wall segment;
coupling an airfoil to each of the plurality of outer wall segments;
coupling the airfoil to an inner wall segment; and
forming an outer wall by coupling each of the outer wall segments to adjacent outer wall segments about a circumference of the vane stage.

16. The method of aspect 15, wherein the airfoil is at least partially made of a ceramic matrix composite.

17. The method of aspects 15-16, wherein each outer wall segment is made of a metal alloy.

18. The method of aspect 17, further comprising forming the plurality of wall segments by additive layer manufacturing.

19. The method of aspect 17, further comprising forming the plurality of wall segments by metal casting in a wax mold.

20. The method of aspects 15-19, further comprising coupling a control arm to the airfoil such that movement of the control arm rotates the airfoil.

What is claimed is:

1. A vane stage segment for use in a vane stage of a turbine engine, comprising:
an outer wall segment configured to be coupled to other outer wall segments to form an outer wall of the vane stage,
an inner wall segment spaced radially inward from the outer wall segment; and
an airfoil extending between the outer wall segment and the inner wall segment,
wherein at least one of the outer wall segment or the inner wall segment comprises:
a forward portion comprising a first interface and an aft portion comprising a second interface, the forward portion and the aft portion separably coupled to each other at the first and second interfaces;
a first portion flange radially extending from the forward portion;
a second portion flange radially extending from the aft portion; and
a fastener securing the first portion flange and the second portion flange together to form the separable coupling between the forward portion and the aft portion.

2. The vane stage segment of claim 1, comprising a plurality of airfoils extending between the outer wall segment and the inner wall segment.

3. The vane stage segment of claim 1, wherein the fastener is a bolt and nut.

4. The vane stage segment of claim 1, wherein the outer wall segment comprises the forward portion and the aft portion separably coupled to each other.

5. The vane stage segment of claim 4, wherein the forward portion comprises a first forward portion, the aft portion comprises a first aft portion, the fastener comprising a first fastener, the inner wall segment comprising:
a second forward portion comprising a third interface and a second aft portion comprising a fourth interface, the second forward portion and the second aft portion separably coupled each other at the third and fourth interfaces;
a third portion flange radially extending from the second forward portion;
a fourth portion flange radially extending from the second aft portion; and
a second fastener securing together the third flange portion and the fourth flange portion to form the separable coupling between the second forward portion and the second aft portion.

6. The vane stage segment of claim 1, wherein the airfoil is separable from the outer wall segment and the inner wall segment.

7. The vane stage segment of claim 6, wherein the airfoil comprises an outer endwall configured to be received within an opening formed in the outer wall segment, the outer endwall having a larger cross-sectional area than the airfoil.

8. The vane stage segment of claim 1, wherein a forward portion of the vane stage segment is unitary body comprising the forward portion of the outer wall segment, the forward portion of the inner wall segment, and a forward portion of airfoil;
wherein an aft portion of the vane stage segment is unitary body comprising the aft portion of the outer wall segment, the aft portion of the inner wall segment, and an aft portion of the airfoil; and
the forward portion of the vane stage segment is configured to couple to the aft portion of the vane stage segment.

9. A vane stage for use in a turbine engine, comprising:
an outer wall comprising a plurality of outer wall segments coupled together circumferentially about a center of the vane stage, wherein each of the outer wall segments comprises an aft portion and a forward portion, and wherein for each of the outer wall segments, an associated forward portion is separably coupled to an associated aft portion by a fastener that is fastening together an associated set of portion flanges radially extending from the associated forward portion and the associated aft portion to form the separable coupling between the associated forward portion and the associated aft portion;
an inner wall spaced radially inward from the outer wall and extending circumferentially about the center of the vane stage; and
a plurality of airfoils spaced circumferentially about the center of the vane stage, each airfoil extending from the inner wall to the outer wall.

10. The vane stage of claim 9, wherein each airfoil comprises an outer projection extending into one of the plurality of outer wall segments, wherein each airfoil is rotatable about the outer projection.

11. The vane stage of claim 10, further comprising a control arm coupled to the outer projections of at least two of the airfoils, wherein the control arm is configured to coordinate the rotation of the airfoils coupled to the control arm.

12. The vane stage of claim 9, wherein each airfoil comprises an outer endwall positioned within an opening formed in one of the outer wall segments wherein the outer endwall of each airfoil is rotatable within the opening.

13. The vane stage of claim 9, wherein each outer wall segment is coupled to adjacent outer wall segments by a plurality of fasteners.

14. A method of manufacturing a vane stage for use in a turbine engine, comprising:
forming a plurality of outer wall segments by separably coupling a forward portion of each outer wall segment to an aft portion of each outer wall segment, wherein, for each outer wall segment, separably coupling the forward portion to the aft portion comprises fastening, with a fastener, a first flange radially extending from the forward portion to a second flange radially extending from the aft portion;

coupling an airfoil to each of the plurality of outer wall segments;

coupling the airfoil to an inner wall segment; and forming an outer wall by coupling each of the outer wall segments to adjacent outer wall segments about a circumference of the vane stage.

15. The method of claim 14, wherein the airfoil is at least partially made of a ceramic matrix composite.

16. The method of claim 15, wherein each outer wall segment is made of a metal alloy.

17. The method of claim 16, further comprising forming the plurality of wall segments by additive layer manufacturing.

18. The method of claim 16, further comprising forming the plurality of wall segments by metal casting in a wax mold.

19. The method of claim 14, further comprising coupling a control arm to the airfoil such that movement of the control arm rotates the airfoil.

* * * * *